United States Patent
Parker, III et al.

(10) Patent No.: US 8,756,254 B2
(45) Date of Patent: Jun. 17, 2014

(54) INTEGRATION OF CRM APPLICATIONS TO ECS APPLICATION USER INTERFACE

(75) Inventors: Wayne Parker, III, Seattle, WA (US); Navin Thadani, Bothell, WA (US); Bahram Bahram Pour, Issaquah, WA (US); Ron Mondri, Bellevue, WA (US); Praveen Upadhyay, Bellevue, WA (US); Dmitri Davydok, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 12/964,025

(22) Filed: Dec. 9, 2010

(65) Prior Publication Data

US 2012/0150547 A1 Jun. 14, 2012

(51) Int. Cl.
G06F 17/30 (2006.01)
H04L 29/06 (2006.01)

(52) U.S. Cl.
USPC .......................................... 707/802; 709/248

(58) Field of Classification Search
None
See application file for complete search history.

(56) References Cited

U.S. PATENT DOCUMENTS

| | | | | |
|---|---|---|---|---|
| 6,742,043 | B1 * | 5/2004 | Moussa et al. | 709/232 |
| 8,326,643 | B1 * | 12/2012 | Eshkenazi et al. | 705/1.1 |
| 2002/0072974 | A1 * | 6/2002 | Pugliese et al. | 705/14 |
| 2003/0187971 | A1 * | 10/2003 | Uliano et al. | 709/223 |
| 2005/0209861 | A1 * | 9/2005 | Hewes et al. | 705/1 |
| 2006/0080363 | A1 | 4/2006 | Vadlamani et al. | |
| 2006/0080468 | A1 * | 4/2006 | Vadlamani et al. | 709/250 |
| 2006/0088144 | A1 * | 4/2006 | Mitchell et al. | 379/88.17 |
| 2006/0150077 | A1 * | 7/2006 | Sheldon et al. | 715/509 |
| 2006/0212299 | A1 * | 9/2006 | Law | 705/1 |
| 2007/0067354 | A1 | 3/2007 | Mullender et al. | |
| 2007/0074121 | A1 * | 3/2007 | Mullender et al. | 715/744 |
| 2007/0100845 | A1 | 5/2007 | Sattler et al. | |
| 2007/0226032 | A1 * | 9/2007 | White et al. | 705/9 |
| 2008/0091448 | A1 | 4/2008 | Niheu et al. | |
| 2008/0155014 | A1 | 6/2008 | Gaffga | |
| 2008/0208806 | A1 * | 8/2008 | Dalfo et al. | 707/3 |
| 2008/0270550 | A1 * | 10/2008 | Pouzin et al. | 709/206 |
| 2008/0271059 | A1 * | 10/2008 | Ott et al. | 719/328 |
| 2009/0070333 | A1 * | 3/2009 | Bailey | 707/9 |
| 2009/0138509 | A1 * | 5/2009 | Hind et al. | 707/104.1 |
| 2009/0249360 | A1 * | 10/2009 | Wiseman et al. | 719/315 |
| 2009/0276218 | A1 * | 11/2009 | Hussey et al. | 704/246 |
| 2011/0145805 | A1 * | 6/2011 | Taylor et al. | 717/168 |
| 2012/0047217 | A1 * | 2/2012 | Hewes et al. | 709/206 |

OTHER PUBLICATIONS

"Outlook Synchronization in Microsoft Dynamics CRM", Retrieved at << http://www.sonomapartners.com/Documents/CRM/MicrosoftCRM4-OutlookSynchronization.pdf >>, Jan. 2010, pp. 1-18.

(Continued)

*Primary Examiner* — Tarek Chbouki
(74) *Attorney, Agent, or Firm* — Brian Haslam; Damon Rieth; Micky Minhas

(57) ABSTRACT

CRM application controls and functionality for multiple CRM applications/instances are integrated with an ECS application user interface by designating a single CRM application/instance as primary and providing synchronization and rich client control capabilities. Other CRM applications/instances are set up as secondary within the ECS user interface employing a single CRM connection module and a single state manager. Accessing a secondary CRM application/instance activates relevant controls applicable to that CRM application/instance without a user having to logout and login to the ECS client.

16 Claims, 6 Drawing Sheets

(56) References Cited

OTHER PUBLICATIONS

Stone, Adam, "Using MS Outlook to integrate ZOHO CRM with D-Tools S15", Retrieved at << http://www.d-toolsblog.com/crm-wars/using-ms-outlook-to-integrate-zoho-crm-with-d-tools-si5/ >>, Aug. 8, 2008, pp. 11.

"CRM 4.0 E-mail Integration Overview", Retrieved at << http://blogs.msdn.com/b/crm/archive/2008/02/07/crm-4-0-e-mail-integration-overview.aspx >>, Feb. 7, 2008, pp. 7.

Bennett, Madeline, "Microsoft adds 'intelligent' ribbon interface to CRM 2011", Retrieved at << http://www.v3.co.uk/v3/news/2269602/microsoft-office-interface-crm >>, Sep. 10, 2010, pp. 2.

"Email and calendaring", Retrieved at << http://www.salesforce.com/crm/sales-force-automation/sales-tools/ >>, Retrieved Date: Sep. 30, 2010, pp. 2.

"Business System Interface", Filed Date: Aug. 23, 2006, Application No. 1497/DEL/2006, pp. 30.

"Web Client Command Infrastructure Integration into a Rich Client Application", Filed Date: Jun. 8, 2010, U.S. Appl. No. 12/796,448, pp. 29.

Niiranen, Jukka, "Outlook 2007 with Dynamics CRM 2011: will it blend?", Retrieved at << http://niiranen.eu/crm/tag/crm-2011/ >>, Sep. 16, 2010, pp. 11.

Dutcher, Tim, "Export CRM customizations using PowerShell", Retrieved at << http://www.altriva.com/AltrivaBlog/PostID/12.aspx >>, Jun. 10, 2009, pp. 3.

* cited by examiner

INTEGRATION OF CRM APPLICATIONS TO ECS APPLICATION USER INTERFACE

BACKGROUND

Customer Relationship Management (CRM) solutions provide tools and capabilities needed to create and maintain a clear picture of customers, from first contact through purchase and post-sales. For complex organizations, a CRM system may provide features and capabilities to help improve the way sales, marketing, and/or customer service organizations target new customers, manage marketing campaigns, and drive sales activities. CRM systems may include many components, hardware and software, utilized individually or in a shared manner by users internal or external to an organization.

CRM systems are an example of computing systems where data associated with entities such as persons, organizations, accounts, and similar ones are maintained for various purposes. Some of the information collected and maintained by CRM applications/instances of CRM applications may also be collected or consumed by other common applications such as email, contact, and/or scheduling (ECS) applications (for example, Outlook® by Microsoft Corporation of Redmond, Wash.). Access to data and/or functionality of a CRM application/instance may be provided from within a user interface of an ECS application through an add-in module or similar arrangement, where specific controls may be provided as part of the ECS application user interface controls.

CRM applications/instances are typically organization-specific. In other words, configuration, setup, data, credentials, etc. for a user's access to a CRM application/instance for a particular organization may be different if the same user has access to a CRM application/instance for another organization. For example, a consultant may have access to the CRM systems of multiple companies. Even though all companies may use the same CRM application, the consultant would have to log in using different credentials and access different sets of data for each company. Thus, a user may have access to a CRM application/instance through the user interface of their ECS application, but would have to logout and login each time they want to navigate through the CRM data of a different organization, application, and/or instance of CRM application.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to integration of CRM application/instance controls for multiple organizations with an ECS application user interface. According to some embodiments, a single CRM application/instance may be designated as primary providing synchronization and rich client control capabilities. Other CRM applications/instances may be set up as secondary within the ECS user interface employing a single CRM connection module and a single state manager. Accessing a secondary CRM application/instance may activate relevant controls applicable to that CRM application/instance without a user having to logout and login to the ECS client. Each CRM application/instance may be represented as a distinct messaging architecture data store (e.g. a Messaging Application Programming Interface 'MAPI' store).

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
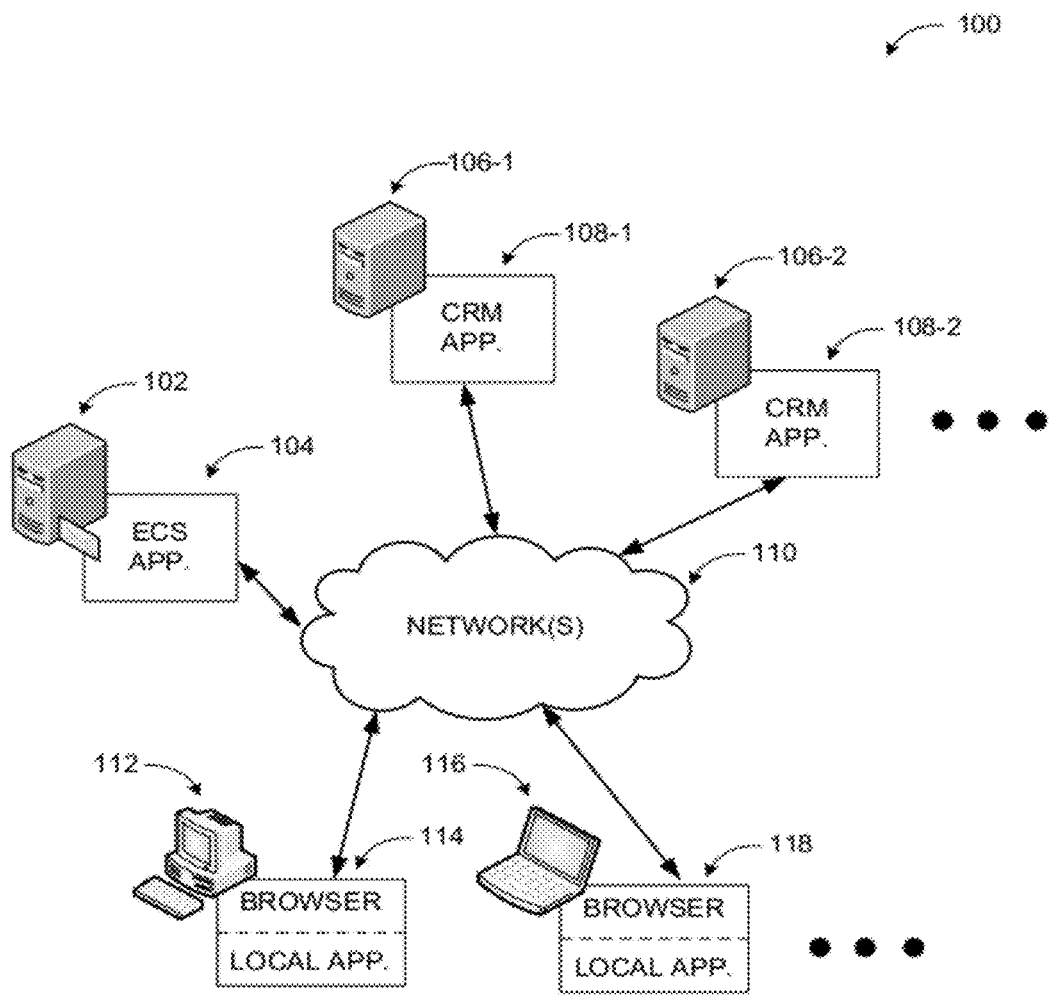
FIG. 1 illustrates a networked environment, where CRM and ECS applications may be integrated according to some embodiments.

As briefly described above, multiple CRM application/instance controls may be integrated with an ECS application user interface by designating a single CRM application/instance as primary to provide synchronization and rich client control capabilities and designating other CRM application/instance as secondary. A single state manager may manage each CRM application/instance context with the ECS application user interface having integrated CRM controls that are automatically customized for each CRM application/instance. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing CRM and/or email, contact, scheduling based services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

The combined term ECS application is used herein to collectively describe hosted and/or local applications that provide email, scheduling, contact management, calendaring, and similar services. An example of such applications is Outlook® by Microsoft Corp. of Redmond, Wash. Such applications may provide one or more of the above listed functionality through a number of user interfaces. They may be executed on a server as a hosted service and accessed by users through thin clients such as browsers or locally executed client applications. Some of the services may be provided online, others may be provided offline. For simplicity, such applications are referred to collectively as ECS applications.

Referring to FIG. 1, diagram 100 illustrates a networked environment, where CRM and ECS applications may be integrated according to some embodiments. The computing devices and computing environments shown in diagram 100 are for illustration purposes. Embodiments may be implemented in various local, networked, and similar computing environments employing a variety of computing devices and systems.

In an example environment illustrated in diagram 100, users may access CRM applications 108-1, 108-2 executed on CRM servers 106-1, 106-1 through a browser or client application (114, 118) executed on their computing devices 112, 116 via network(s) 110. CRM applications 108-1, 108-2 may be different instances of a CRM system and/or each associated with a different organization. Alternatively, a single CRM application/instance may enable a user to access data and functionality for different organizations through different credentials. The users may also access email, contact management, and/or scheduling services managed by an ECS application 104 executed on server 102 through the same or different browser or client application (114, 118) executed on their computing devices 112, 116 via network(s) 110. Some of the tasks associated with the ECS services may be performed online, while others may be performed offline. In case of dedicated client applications, the client application is sometimes referred to as offline client when it is operating without a connection to the ECS application 104. When the client application is in contact with the ECS application 104, it may be referred to as online client.

Both, ECS application 104 and CRM applications 108-1, 108-2 may collect and consume similar information such as contact information, appointment/meeting information, email data, and comparable data. Access to at least some of the functionality and data of the CRM applications 108-1, 108-2 may be provided through the user interface of the ECS application 104 (e.g. through a rich client or browser based access) with custom control elements enabling a user to integrate the functionality such as email consolidation, follow-up operations, conditional formatting, and similar functionality through the ECS user interface. Without this functionality, a user may have to open two separate applications and manually perform the operations.

In case of multi-CRM application/instance connections, however, users are typically assigned distinct credentials. Thus, in order to access data and functionality for different CRM applications/instances, a user may have to open different instances of the client application or altogether different applications. In a system according to embodiments, an integration module within the ECS application (client or service) may integrate access to CRM application/instance functionality and data within the same ECS application user interface. One of the CRM applications/instances may be designated as primary providing synchronization and rich client control capabilities. Other CRM applications/instances may be set up as secondary within the ECS user interface employing a single CRM connection module and a single state manager. Accessing a secondary CRM application/instance may activate relevant controls applicable to that CRM application/instance without a user having to logout and login to the ECS client.

Conventional synchronization approaches rely on messaging architecture and a Component Object Model, such as Messaging Application Programming Interface (MAPI)/RPC on change events. A system according to embodiments may represent each CRM application/instance as a MAPI data store associated with different server identifiers (e.g. Uniform Resource Locator 'URL') and/or different credentials. When a different CRM application/instance is requested by the user, the controls of the user interface may be updated to include elements/actions applicable to the requested CRM application/instance.

Thus, each CRM application/instance's information or 'Organization Context' may be assigned an identifier (e.g. a unique key) for retrieval from repository store. A separate MAPI store may be used for each CRM application/instance configured in a user's profile. A one-to-one relation may be established between each MAPI store and corresponding Organization Context. An appropriate Organization Context may be made available from a current MAPI folder in the ECS user interface. For non-CRM folders like ECS Inbox, the primary Organization Context may be used for any actions. Any transaction, data processing, or action may be associated with a corresponding Organization Context activating appropriate sub-user interfaces within the ECS user interface and connecting to respective CRM server(s) with the proper credentials.

According to other embodiments, each Organization Context may have its own State (e.g. Enable, Disable, and Offline) and transition between these states may not affect any other Organization Context state(s). For example, Organization Context may be in Disable state but another one in Enabled or Offline state. ECS data store(s) may be made Organization Context sensitive and store and/or retrieve data based on Organization Context identifier.

According to some embodiments, data such as CRM contacts and CRM activities may be exchanged and synchronized between the online and offline versions of an ECS client CRM application in addition to providing access to different CRM functionalities through the sub-user interfaces. Computing devices 112 and 116, through which the users may access the ECS and/or CRM applications, may be any computing device including, but not limited to, desktop computers, laptop computers, servers, handheld computers, vehicle mount computers, smart phones, and comparable devices.

Figure 2:
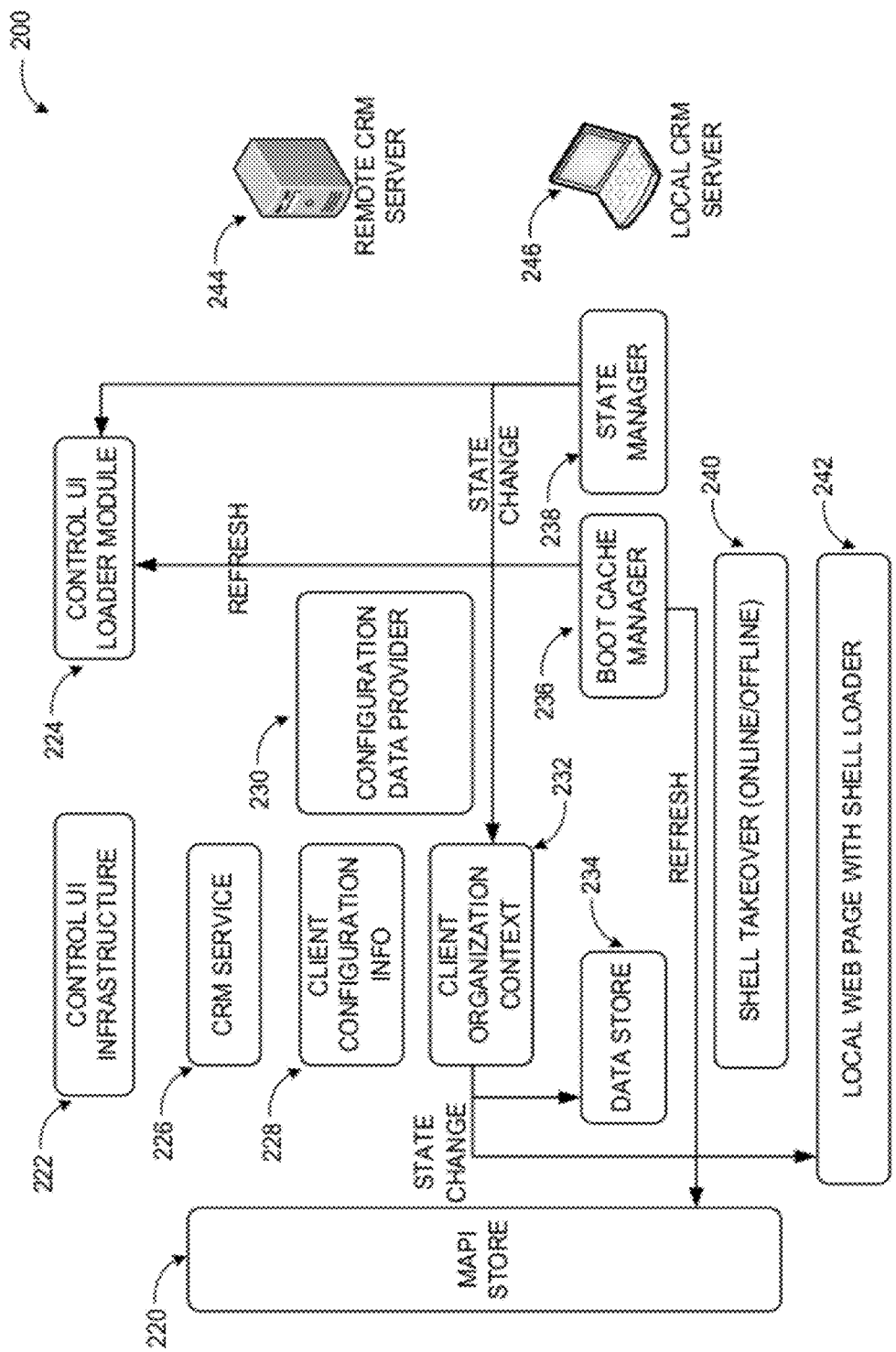
FIG. 2 illustrates an example architecture of a system integrating multiple CRM systems to an ECS application.

FIG. 2 illustrates an example architecture of a system integrating multiple CRM systems to an ECS application. In the example architecture of diagram 200, client organization context 232 serves as the center of the system's universe and is a factory for the data store 234 and the boot cache manager 236, since these objects are closely coupled with a particular organization and a separate instance of these objects may exist for each organization. The boot cache manager 236 the data store 234 may also maintain a reference back to the client organization context 232 to be able to connect back to the appropriate server (e.g. remote CRM server 244).

The client organization context 232, when it is first created, may start up the state manager 238. The state manager 238, which may also be started by control UI loader module 224 activation, may be reference-counted to ensure no more than one instance of it exists. The client organization context 232 may encapsulate the current state of the state manager 238 for a particular CRM application/instance including an online \ offline state, a location identifier for connection, an enable \ disable state, an authentication state, and comparable ones. Multiple CRM application/instance contexts may each be in a different connectivity state based on connectivity. According to some embodiments, the client organization context 232 may have a static factory method to return the client context for a given CRM application/instance identifier. Client organization context 232 may read all the configuration information (such as location identifiers, offline state, etc.) from the configuration data provider 230 in order to support simultaneous multiple configured organizations. The client organization context 232 may also expose state change events to allow other components to react to connectivity state changes.

State manager 238 may include a dictionary of CRM application/instance contexts. In each cycle, the state manager 238 may iterate through all the CRM applications/instances in the dictionary and evaluate the result of the state engine for a CRM application/instance and raise the appropriate events. In case a new store starts between two state manager cycles, the thread may be awakened prematurely to process the new organization. CRM applications/instances in the dictionary may be reset to unprocessed, when the thread is awakened due to a timeout or a network event. When a manual event for go-online or offline is triggered the state manager cycle may be completed (if it is in progress) and restarted for the primary CRM application/instance. Some of the operations in the state manager 238 (for example, go offline, start background synchronization, etc.) may be handled as a special case for the primary CRM application/instance, so that these processes are not started for secondary CRM applications/instances.

The client configuration information 228 may provide information about the overall configuration of the client (for example, whether the client has been configured and the identifier of the primary CRM application/instance). The client configuration information 228 and the client organization context 232 may use the data provider 230 to read and write data.

Boot cache manager 236 may manage the life cycle of the UI configuration file. Whenever a request for the UI configuration file is received, boot cache manager 236 may load it up from disk, if it is not already in memory, while asynchronously checking with the appropriate server for an updated copy. If there is no persisted copy of the UI configuration file, boot cache manager 236 may return an empty UI configuration file. The boot cache manager 236 may also synchronize with the state manager 238 before connecting to the CRM service 226. Whenever it receives an updated copy of the UI configuration file, boot cache manager 236 may raise a refresh event that consumers need to register for and process appropriately.

When the MAPI store 220 starts up, it may query the boot cache manager 236 for the current UI configuration file (to be able to return the set of folders to ECS application). Whenever MAPI store 220 receives a Refresh event from the boot cache manager 236, the store may react by returning an appropriate set of folders to the ECS application. When the MAPI store 220 needs any data, it may retrieve the appropriate data store 234 from the client organization context 232. If the client organization context 232 claims that the CRM application/instance is connected, then the data store 234 may use the CRM service 226, which takes client organization context 232 as a parameter, to construct a CRM service object. Data store 234 may be able to make requests using the CRM service object. The complexity between connecting to the local CRM server 246 or remote CRM server 244 based on online state or authorization mechanism may be abstracted by the CRM service 226.

The control UI loader module 224 may manage the lifecycle of the control UI infrastructure 222 that is returned to ECS application. According to some embodiments, the control UI loader module 224 may be a light weight add-in module that is responsible for returning the UI configuration file to the ECS application. The control UI loader module 224 may be registered as a load on demand add-in, for example, and loaded by the state manager 238 when it reaches the Enabled state. In addition, a Refresh event from the boot cache manager 236, which may detect a change in the UI configuration file definition, may also cause the control UI loader module 224 to be reloaded. The control UI loader module 224 may consume the UI configuration file definition returned by the boot cache manager 236 for the CRM application/instance whose MAPI store 220 is currently added to the ECS profile.

Each folder in the MAPI store 220 may point to a local web page that hosts a shell loader (242) that houses a web browser control. The shell loader may query the client organization context 232 for the current state of the CRM application/instance and redirect the inner web browser to either the online or the offline page (240) based on the current online state. If the CRM application/instance is disconnected (or still loading), the shell loader may display an appropriate user interface presenting a message to the user.

Figure 3:
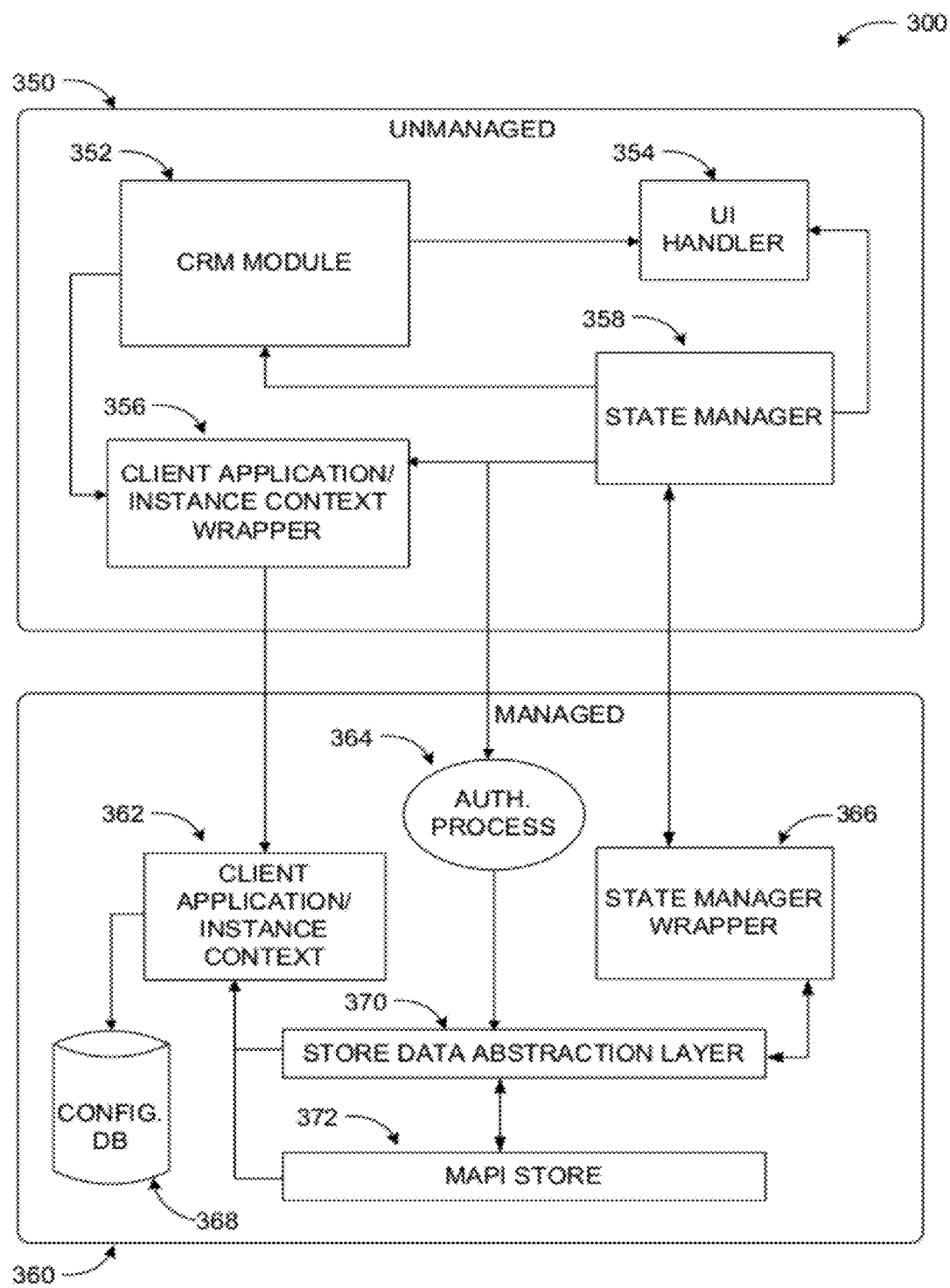
FIG. 3 illustrates major components in a system according to embodiments.

FIG. 3 illustrates major components in a system according to embodiments. Diagram 300 illustrates the objects involved in major operations/tasks of a system providing integration of multiple CRM applications/instances and an ECS user interface. In diagram 300, the objects are shown in two categories: unmanaged (350) and managed (360).

Unmanaged objects may include a CRM module 352, user interface handler 354, state manager 358, and client organization context wrapper 356. State manager 358 may remain as a singleton class in both managed and unmanaged sides (350, 360). A managed wrapper for state manager 366 may support select event mechanisms for raising state events. State manager 358 may fire following events base on final status of each execution: Disabled, Enabled (Online/Offline), Network (Connected, Disconnected), and comparable ones.

On the managed side (360), MAPI store 372 may a store data abstraction layer 370 for CRM connection. Store data abstraction layer 370 may use state manager 358 to determine the CRM server status. CRM module 352 and MAPI store 372 may try to start state manager 358, but one of them may lose depending on which state manager has already been started by the other one. Client organization context 362 may read configuration information (such as location identifiers, offline state, etc.) from configuration database 368 in order to support simultaneous multiple configured CRM applications/instances. Connection to a local CRM server or a remote CRM server may be abstracted by the store data abstraction layer 370 based on online state information from state manager 358 or authorization mechanism 364.

The examples in FIG. 1 through 3 have been described with specific configurations and components. Embodiments are not limited to systems according to these example configurations and components. Integration of multiple CRM applications/instances and ECS application user interfaces may be implemented in configurations using other types of components, processes, and configurations in a similar manner using the principles described herein.

Figure 4:
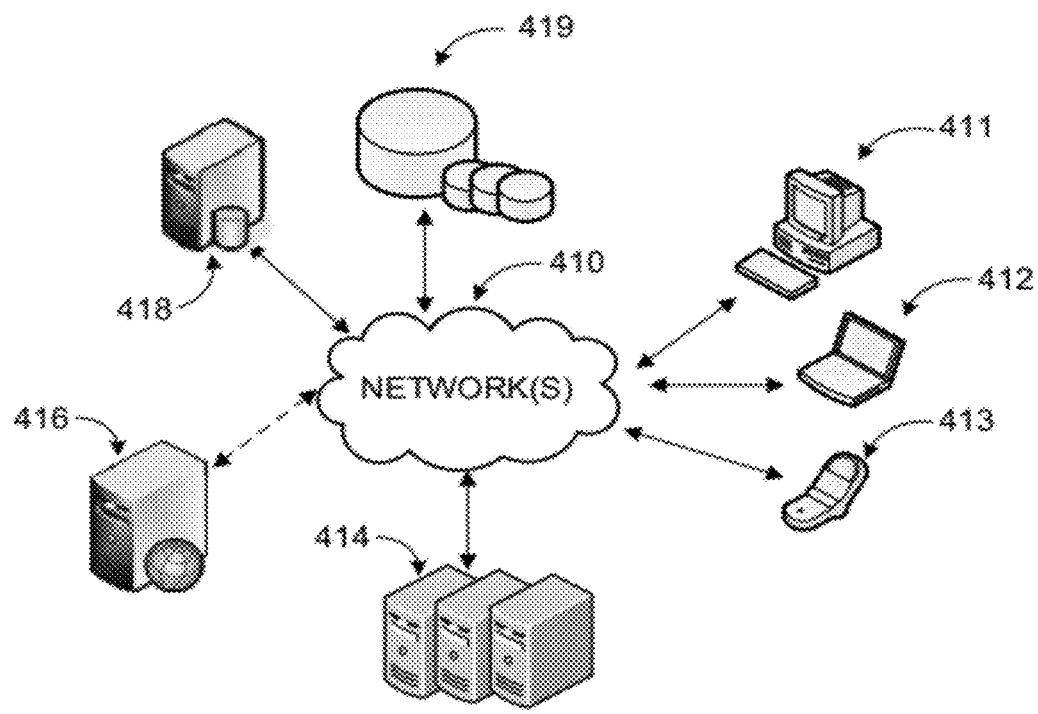
FIG. 4 is a networked environment, where a system according to embodiments may be implemented.

FIG. 4 is an example networked environment, where embodiments may be implemented. A system for integration of CRM application controls and functionality to ECS application user interface may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications with an ECS application executed on one or more of servers 414 and one or more CRM applications executed on server 416 (or other servers). An integration module executed in conjunction with a client ECS application one any one of the client devices 411-413 may facilitate integration of CRM application controls for a plurality of CRM applications/instances into an ECS application user interface such that a user can seamlessly navigate through the controls and functionality of CRM applications for different organizations as discussed previously. The CRM and/or ECS applications may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing integration between ECS user interface and multiple CRM applications/instances. Furthermore, the networked environments discussed in FIG. 4 are for illustration purposes only. Embodiments are not limited to the example applications, modules, or processes.

Figure 5:
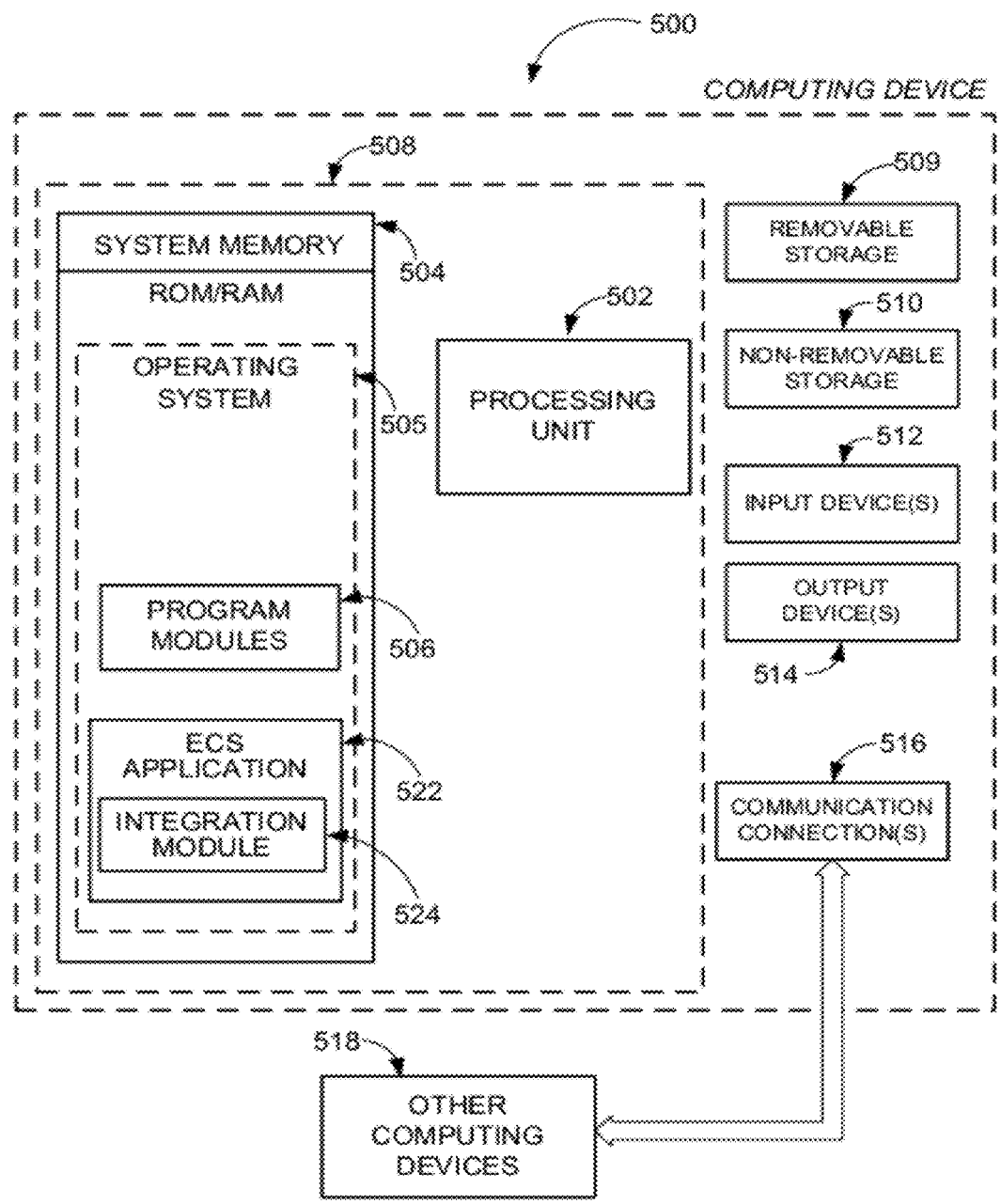
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application capable of providing email, contact management, scheduling, and similar services, as well as access to a CRM application/instance according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, ECS application 522, and integration module 524.

ECS application 522 may provide email, scheduling, contact management, and comparable services in conjunction with a hosted service. Integration module 524 may integrate controls for multiple CRM applications/instances with an ECS application user interface setting up a single CRM application/instance as primary providing synchronization and rich client control capabilities. Other CRM applications/instances may be set up as secondary CRM applications/instances within the ECS user interface employing a single CRM connection module and a single state manager. ECS application 522 and integration module 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
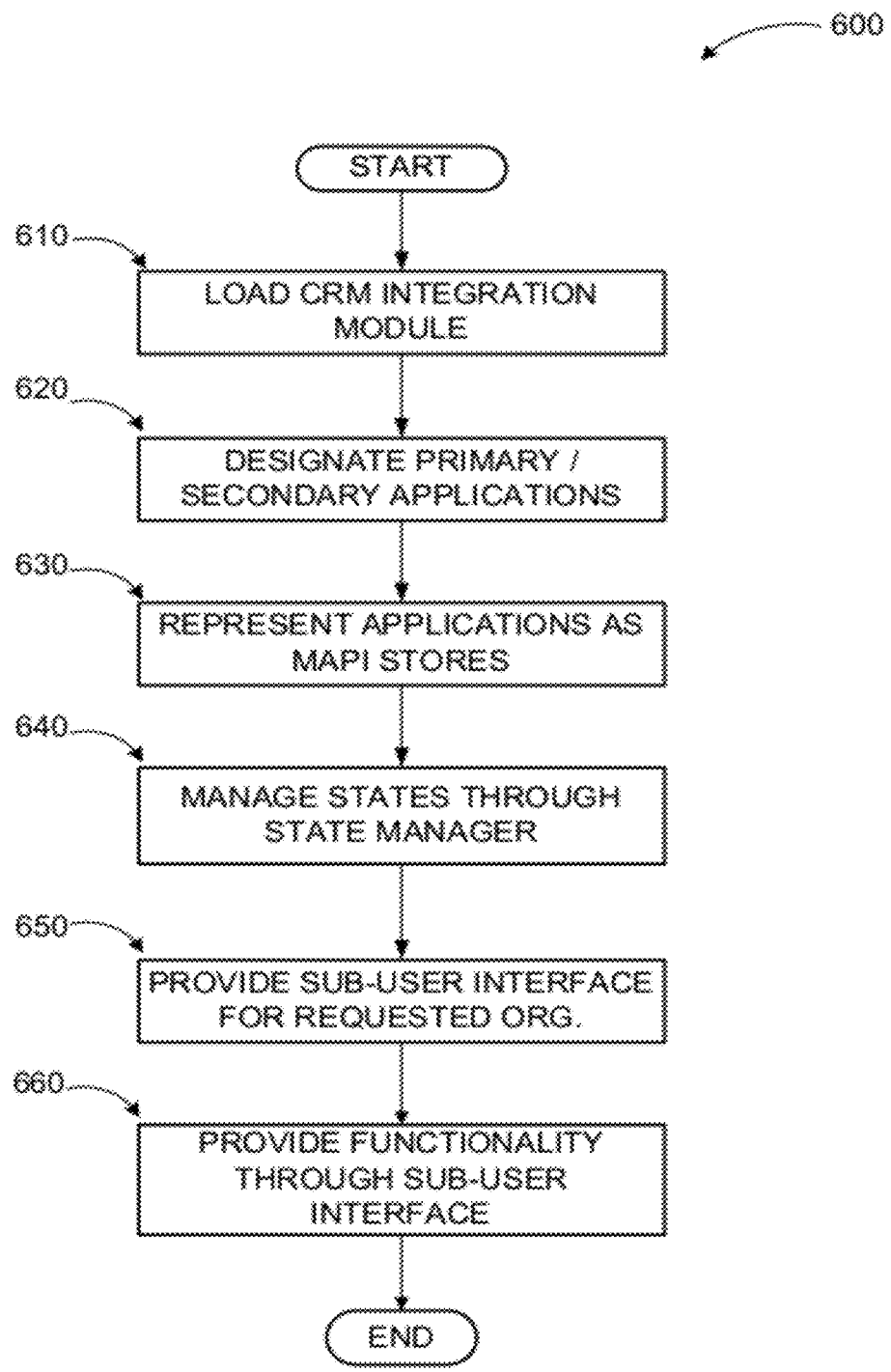
FIG. 6 illustrates a logic flow diagram for a process of integrating controls for multiple CRM applications/instances into an ECS application user interface according to embodiments.

FIG. 6 illustrates a logic flow diagram for process 600 of integrating multiple CRM applications/instances into an ECS application user interface according to embodiments. Process 600 may be implemented on a server or client device.

Process 600 begins with operation 610, where a CRM integration module is loaded in an ECS application to provide integration of CRM connectivity and functionality with one or more CRM servers (and thereby CRM applications/instances). At operation 620, a CRM application/instance may be designated as the primary for synchronization and rich client control capabilities. Other CRM applications/instances may be set up as secondary within the ECS user interface employing the same CRM connection module and a single state manager. According to other embodiments, the primary and secondary designations may not be necessary. One of the plurality of CRM applications/instances may be selected automatically, through manual selection, or through a combination of both. Some functions may determine the instance automatically, others may require manual selection. For example, a user may receive an email from a person, the system may determine the originating person is in the CRM system and set the context of the email and subsequent operations to the CRM system. According to another example implementation, a user may receive an email from a person, choose to track the person in CRM, and may be prompted for which instance.

At operation 630, different CRM applications/instances may be represented within the ECS application as distinct MAPI stores. Of course, other messaging architecture store types may also be used. The states of the CRM services associated with the different CRM applications/instances may be managed by the state manager at operation 640 with each CRM application/instance being associated with a different instance of the state manager.

At operation 650, a sub-user interface may be provided within the user interface controls of the ECS application for a requested CRM application/instance. Available data, functionality, and/or configuration may be different for different CRM applications/instances. Thus, in response to the user requesting connection to a specific CRM application/instance, the sub-user interface may be modified with custom controls for that CRM application/instance. At operation 660, relevant CRM functionality may be provided through the presented sub-user interface to the user within the overall ECS application user interface.

The operations included in process 600 are for illustration purposes. Seamless integration of multiple CRM applications/instances into ECS application user interface may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for integrating functionality of a plurality of customer relationship management (CRM) applications/instances into an email, contact management, scheduling (ECS) application user interface, the method comprising:
   loading a CRM integration module in an instance of the ECS application;
   selecting one of the plurality of CRM applications/instances based on at least one from a set of: automatic selection and user selection;
   determining a context for the selected CRM application/instance;
   presenting a sub-user interface associated with CRM functionality related to the selected CRM application/instance within a user interface of the ECS application;
   querying a boot cache manager for a current sub-user interface configuration file upon start-up, wherein a Messaging Application Programming Interface (MAPI) data store within the ECS application queries the boot cache manager;
   managing states of the selected CRM application/instance and remaining CRM applications/instances through a state manager, wherein the state manager maintains a dictionary of CRM application/instance contexts and iterates through CRM applications/instances in the dictionary to evaluate a result of state determination for each CRM application/instance in each cycle; and
   in response to a selection of another CRM application/instance, activate a new instance of the state manager, update a state of a previously selected organization and the currently selected CRM application/instance, and retrieve configuration data associated with another sub-user interface, wherein each sub-user interface includes controls associated with actions related to the corresponding CRM application/instance.

2. The method of claim 1, further comprising:
   representing each CRM application/instance as the MAPI data store within the ECS application, wherein each MAPI store is associated with a location identifier for a server executing the CRM application/instance and a set of credentials for a user to access CRM data for the corresponding CRM application/instance.

3. The method of claim 1, wherein the context is determined from at least one from a set of: an email, a document, a presentation, and a task associated with the ECS user interface.

4. The method of claim 3, further comprising:
employing an organization context object to provide information associated with the context of each CRM application/instance, wherein a one-to-one relationship is established between each MAPI store and a corresponding organization context object; and
activating through the organization context object the sub-user interface that includes controls for at least one of a transaction and a data processing action associated with the selected CRM application/instance.

5. The method of claim 4, wherein each organization context object is associated with one of: an Enable state, a Disable state, and an Offline state.

6. The method of claim 5, wherein a transition between the states of one instance of the organization context object is independent from a state of another instance of the organization context object.

7. The method of claim 1, further comprising:
employing a boot cache manager object to manage a life-cycle of a sub-user interface configuration file, wherein the sub-user interface configuration file is updated in response to refresh event from a corresponding CRM application by the boot cache manager and the sub-user interface updated based on the updated sub-user interface configuration file.

8. The method of claim 1, further comprising:
abstracting a connection between a local CRM server and a remote CRM server for accessing CRM functionality based on at least one of an online state of an organization context object and an authorization mechanism.

9. A computing device for facilitating access to email, contact management, scheduling (ECS) and customer relationship management (CRM) services associated with a plurality of CRM applications/instances, the computing device comprising:
a memory;
a processor coupled to the memory, the processor executing an ECS application and a CRM integration module associated with the ECS application, the CRM module configured to:
select one of the plurality of CRM applications/instances based on at least one from a set of: automatic selection and user selection;
determine a context for the selected CRM application/instance;
present a sub-user interface associated with CRM functionality related to the selected CRM application/instance within a user interface of the ECS application employing an organization context object to provide information associated with the selected CRM application/instance, wherein a one-to-one relationship is established between a Messaging Application Programming Interface (MAPI) data store within the ECS application assigned to the selected CRM application/instance and the organization context object;
query a boot cache manager for a current sub-user interface configuration file upon start-up, wherein the MAPI data store within the ECS application queries the boot cache manager;
receive a set of corresponding folders to the ECS application in response to refresh updates to the sub-user interface configuration file;
manage states of CRM applications/instances through a state manager, wherein the state manager maintains a dictionary of CRM application/instance contexts and iterates through the CRM applications/instances in the dictionary to evaluate a result of state determination for each CRM application/instance in each cycle; and
in response to a selection of another CRM application/instance, activate a new instance of the state manager, update a state of the previously selected organization and the currently selected CRM application/instance, and retrieve configuration data associated with the other sub-user interface, wherein each sub-user interface includes controls associated with actions related to the corresponding CRM application/instance.

10. The computing device of claim 9, wherein the selected CRM application/instance is designated as primary and remaining CRM applications/instances are designated as secondary.

11. The computing device of claim 9, wherein the organization context object starts the state manager when it is created.

12. The computing device of claim 9, wherein organization context object is configured to encapsulate a current state of the state manager for the selected CRM application/instance, and wherein the state of the state manager includes one of: an online / offline state, a location identifier for connection to a CRM server, an enable / disable state, and an authentication state.

13. The computing device of claim 9, wherein the organization context object is further configured to expose state change events such that other components of the CRM integration module are enabled to react to connectivity state changes.

14. A computer-readable storage medium with instructions stored thereon for integrating functionality of a plurality of customer relationship management (CRM) applications/instances into an email, contact management, scheduling (ECS) application user interface, the instructions comprising:
loading a CRM integration module in an instance of the ECS application;
designating one of the plurality of CRM applications/instances as a primary CRM application/instance;
representing each CRM application/instance as a Messaging Application Programming Interface (MAPI) data store within the ECS application;
employing an organization context object to provide information associated with each CRM application/instance, wherein a one-to-one relationship is established between each MAPI store and a corresponding organization context object;
in response to a user selection of one of the CRM applications/instances, presenting a sub-user interface associated with CRM functionality related to the selected CRM application/instance within a user interface of the ECS application;
querying a boot cache manager for a current sub-user interface configuration file upon start-up, wherein the MAPI data store within the ECS application queries the boot cache manager;
receiving a set of corresponding folders to the ECS application in response to refresh updates to the sub-user interface configuration file;
managing states of CRM applications/instances through a state manager, wherein the state manager maintains a dictionary of CRM application/instance contexts and iterates through the CRM applications/instances in the dictionary to evaluate a result of state determination for each CRM application/instance in each cycle; and in response to a user selection of another CRM application/instance, activating a new instance of the state manager, updating a state of the previously selected organization and the currently selected CRM application/instance, and retrieving configuration data associated with the other sub-user interface, wherein each sub-user interface includes controls associated with actions related to the corresponding CRM application/instance.

15. The computer-readable medium of claim 14, wherein the instructions further comprise:

in response to the user selection of the other CRM application/instance, presenting another sub-user interface associated with CRM functionality related to the selected other CRM application/instance within the user interface of the ECS application.

16. The computer-readable medium of claim 14, wherein synchronization and rich client capabilities are provided in association with the primary designated CRM application/instance through the organization context object.

* * * * *